(12) United States Patent
Patani et al.

(10) Patent No.: US 8,799,701 B2
(45) Date of Patent: Aug. 5, 2014

(54) SYSTEMS AND METHODS OF PROVIDING HIGH AVAILABILITY OF TELECOMMUNICATIONS SYSTEMS AND DEVICES

(75) Inventors: Ritesh H. Patani, Santa Clara, CA (US); Ajoy K. Agrawal, San Jose, CA (US); Seshu Konduri, San Jose, CA (US)

(73) Assignee: Dialogic Inc., Milpitas, CA (US)

( * ) Notice: Subject to any disclaimer, the term of this patent is extended or adjusted under 35 U.S.C. 154(b) by 155 days.

(21) Appl. No.: 13/364,735

(22) Filed: Feb. 2, 2012

(65) Prior Publication Data

US 2013/0205161 A1 Aug. 8, 2013

(51) Int. Cl.
G06F 11/00 (2006.01)

(52) U.S. Cl.
USPC .................................. 714/4.1; 714/1

(58) Field of Classification Search
USPC ............... 714/4.1, 25, 47.1, 47.3, 4.11, 1; 709/202, 217, 223, 225, 221
See application file for complete search history.

(56) References Cited

U.S. PATENT DOCUMENTS

| | | | | |
|---|---|---|---|---|
| 6,658,469 B1 * | 12/2003 | Massa et al. | ................. | 709/224 |
| 6,675,200 B1 * | 1/2004 | Cheriton et al. | ............. | 709/212 |
| 7,895,463 B2 * | 2/2011 | Bagepalli et al. | ............. | 714/4.1 |
| 7,975,187 B2 * | 7/2011 | Kogan et al. | ................... | 714/48 |
| 8,046,446 B1 | 10/2011 | Karr et al. | | |
| 2003/0126240 A1 * | 7/2003 | Vosseler | ....................... | 709/221 |
| 2005/0027862 A1 * | 2/2005 | Nguyen et al. | ............... | 709/225 |
| 2006/0112061 A1 * | 5/2006 | Masurkar | ....................... | 706/47 |
| 2006/0288208 A1 | 12/2006 | Dashora et al. | | |
| 2009/0063893 A1 | 3/2009 | Bagepalli et al. | | |
| 2010/0125745 A1 | 5/2010 | Kogan et al. | | |

OTHER PUBLICATIONS

International Search Report of PCT Appl. No. PCT/US13/24122, International Filing Date Jan. 31, 2013.

* cited by examiner

*Primary Examiner* — Dieu-Minh Le
(74) *Attorney, Agent, or Firm* — Chapin IP Law, LLC

(57) ABSTRACT

Systems and methods of providing high availability of telecommunications systems and devices in a telecommunications network. A telecommunications device is deployed in a high availability configuration that includes two or more peer device platforms, in which each peer device platform can operate in either an active mode or a standby mode. Each peer device platform includes a device health monitoring component and a rules engine. By detecting one or more failures and/or faults associated with the peer device platforms using the respective device health monitoring components, and generating, using the rules engine, a health count for each peer device platform based on the detected failures/faults and one or more predetermined rules, failover decisions can be made based on a comparison of the health counts for the respective peer device platforms, while reducing the impact on the telecommunications network and providing an increased level of user control over the failover decisions.

27 Claims, 3 Drawing Sheets

SYSTEMS AND METHODS OF PROVIDING HIGH AVAILABILITY OF TELECOMMUNICATIONS SYSTEMS AND DEVICES

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to telecommunications systems and devices, and more specifically to systems and methods of providing high availability of telecommunications systems and devices.

BACKGROUND OF THE INVENTION

Telecommunications networks are known that employ redundancy mechanisms for providing high availability of telecommunications systems, devices, and/or other resources within the respective networks. Such redundancy mechanisms typically involve an active device and at least one standby device, and provide high availability of resources within telecommunications networks by switching over to activate the standby device when the corresponding active device fails or is taken out of service. Such redundancy mechanisms are particularly important in the operation of session border controllers and other network security devices, which are frequently called upon to provide 99.999% (such 99.999% is also referred to herein as "five 9's") reliability and availability due to the critical roles such devices play in the operation of telecommunications networks. For example, redundancy mechanisms employed in conjunction with such network security devices are generally required to determine a variety of failures and/or faults associated with the respective devices, and to make failover decisions based on the results of such failure and/or fault determinations. However, typical redundancy mechanisms employed in known telecommunications networks may not provide the desired minimal impact on the telecommunications networks when performing such switchovers from active to standby devices, and may not provide the desired level of user control over failover decision making. Such redundancy mechanisms may also fail to take complete account of the deterministic behaviors of the devices when making such failover decisions.

It would therefore be desirable to have improved systems and methods of providing high availability of telecommunications systems and devices that avoid at least some of the drawbacks of typical redundancy mechanisms employed in known telecommunications networks.

BRIEF SUMMARY OF THE INVENTION

In accordance with the present application, improved systems and methods of providing high availability of telecommunications systems and devices in a telecommunications network are disclosed. In the presently disclosed systems and methods, a telecommunications system or device is deployed in a high availability configuration (such a high availability configuration is also referred to herein as a/the "1+1 configuration") that includes at least two peer device platforms, in which each peer device platform is configured to operate in either an active mode or a standby mode. Each peer device platform includes substantially the same functional components as the other peer device platform, including at least a device health monitoring component and a rules engine. By detecting one or more failures and/or faults associated with the peer device platforms using the respective device health monitoring components, and generating, using the respective rules engines, a count representing a health condition (such a count representing a health condition is also referred to herein as a/the "health count") of each peer device platform based at least on the detected failures/faults and one or more predetermined rules, failover decisions can be made based at least on a comparison of the health counts for the respective peer device platforms. Moreover, by formulating the predetermined rules to take into account the criticality of the detected failures/faults, and the redundancy and/or scalability of the functional components within the respective peer device platforms, such failover decisions can be beneficially made so as to reduce the overall impact on the telecommunications network, while beneficially providing an increased level of user control over the failover decisions.

In accordance with a first aspect, an exemplary system for providing high availability of telecommunications systems and devices (such an exemplary system is also referred to herein as a/the "high availability telecommunications system") includes a first peer device platform and a second peer device platform. The first and second peer device platforms each include at least a device health monitoring component and a rules engine. Each of the first and second peer device platforms can also include a data repository operative to store data, including, but not limited to, configuration data, for the respective peer device platform. The data repository included in each of the first and second peer device platforms can store substantially the same configuration data as the data repository included in the other peer device platform. Each of the first and second peer device platforms can further include one or more additional functional components, including one or more predetermined hardware components, one or more predetermined software components, and/or at least one component for handling user initiated actions from one or more user clients. The data repositories included in the respective first and second peer device platforms are communicably coupled to one another via a first network connection, and the device health monitoring components included in the respective first and second peer device platforms are communicably coupled to one another via a second network connection. For example, the first network connection and the second network connection can be virtual network connections, and can share the same physical network connection.

In accordance with an exemplary mode of operation of the high availability telecommunications system, the first peer device platform and the second peer device platform are deployed in a 1+1 configuration, in which the first peer device platform is operating in the active mode (such a peer device platform operating in the active mode is also referred to herein as an/the "active peer device platform"), and the second peer device platform is operating in the standby mode (such a peer device platform operating in the standby mode is also referred to herein as a/the "standby peer device platform"). Each of the first and second peer device platforms employs the rules engine included in the respective peer device platform to generate a first or initial health count for the peer device platform, based at least on the one or more predetermined rules. In accordance with an exemplary aspect, each of the rules engines included in the respective first and second peer device platforms can generate, calculate, derive, or otherwise obtain the first or initial health count using the one or more predetermined rules, which take into account the criticality of potential detected failures and/or faults, and the redundancy and/or scalability of the functional components included in the peer device platform. In accordance with this exemplary aspect, the one or more predetermined rules can take into account (1) the criticality of potential detected failures/faults by assigning predetermined weighting to corresponding sets of functional components within the respective peer device platforms, and (2) the redundancy and/or scalability of the functional components within the respective peer device platforms by keeping track of the number of instances (such number of instances is also referred to herein as a/the "count") of each such functional component included in the corresponding sets of functional components. Each of the first and second peer device platforms sends, over the second network connection, a status indication of its health count to the device health monitoring component included in the other peer device platform.

In further accordance with the exemplary mode of operation of the high availability telecommunications system, each of the device health monitoring components included in the respective first and second peer device platforms monitors its peer device platform for one or more failures and/or faults associated with one or more functional components included in the peer device platform. For example, such failures/faults associated with the first and second peer device platforms can include (1) a failure or a fault on a hardware component, such as an Ethernet link, a hard disk, or any other suitable hardware component, (2) a failure of a software component, such as a call processing software component or any other suitable software component, and/or (3) a determination that the configuration data stored in the data repositories of the respective first and second peer device platforms are out-of-sync, such that at least a portion of the configuration data stored in the data repository of one peer device platform does not conform with a corresponding portion of the configuration data stored in the data repository of the other peer device platform. Each of the device health monitoring components included in the respective first and second peer device platforms can also monitor the component for handling user initiated actions within its peer device platform for at least one user initiated switchover event, by which a user can voluntarily initiate a switchover to activate the standby peer device platform, notwithstanding the possibility that the standby peer device platform may or may not have one or more failures and/or faults associated therewith, and that the active peer device platform may or may not have one or more failures and/or faults associated therewith.

Upon detecting one or more failures and/or faults associated with the first peer device platform operating as the active peer device platform, the device health monitoring component included in the first peer device platform provides an indication of the detected failure/fault event to the rules engine within the first peer device platform. Based at least on the detected failure/fault event associated with the first peer device platform, the rules engine regenerates, recalculates, re-derives, or otherwise re-obtains the health count for the first peer device platform using one or more of the predetermined rules, thereby obtaining an updated health count for the first peer device platform. In effect, the rules engine evaluates the detected failure/fault event against the predetermined rules. The rules engine provides an indication of the updated health count for the first peer device platform to the device health monitoring component included in the first peer device platform. The device health monitoring component compares the updated health count for the first peer device platform to the health count previously received over the second network connection for the second peer device platform, and makes a determination, based at least on the comparison result, as to whether or not to initiate a switchover from the first peer device platform operating as the active peer device platform, to the second peer device platform operating as the standby peer device platform. For example, in the event the comparison result indicates that the updated health count for the first peer device platform is less than the health count for the second peer device platform, the device health monitoring component within the first peer device platform can communicate, over the second network connection, with the device health monitoring component within the second peer device platform to initiate and ultimately accomplish the switchover from the first peer device platform to the second peer device platform. Moreover, in the event the detected failure/fault indicates that the configuration data stored in the data repositories of the respective first and second peer device platforms are out-of-sync, the data repository within the first peer device platform can communicate, over the first network connection, with the data repository within the second peer device platform to synchronize the configuration data stored in the data repositories of the respective peer device platforms. In addition, in the event the detected failure/fault is indicative of a user initiated switchover event from a user client, the device health monitoring component within the first peer device platform can obtain the difference between the updated health count for the first peer device platform and the health count previously received for the second peer device platform, and add the obtained difference to the health count for the second peer device platform prior to the switchover to the second peer device platform, thereby avoiding a potential, substantially immediate, subsequent switchover back to the first peer device platform after having accomplished the desired user initiated switchover to the second peer device platform.

By detecting one or more failures and/or faults associated with one or more functional components included in two or more peer device platforms deployed in a 1+1 configuration, and generating a health count for each peer device platform based at least on the detected failures/faults and one or more predetermined rules, failover decisions can be made based at least on a comparison of the health counts for the respective peer device platforms. Moreover, by formulating the predetermined rules to take into account the criticality of the detected failures/faults, and the redundancy and/or scalability of functional components within the respective peer device platforms, such failover decisions can be beneficially made so as to reduce the overall impact on a telecommunications network, while beneficially providing an increased level of user control over the failover decisions.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of providing high availability of telecommunications systems and devices in a telecommunications network are disclosed. In the presently disclosed systems and methods, a telecommunications system or device is deployed in a high availability configuration (such a high availability configuration is also referred to herein as a/the "1+1 configuration") that includes at least two peer device platforms, in which each peer device platform is configured to operate in either an active mode or a standby mode. Only one of the peer device platforms can operate in the active mode, accepting and processing traffic, at any given time. The peer device platform(s) operating in the standby mode serve as idle standby unit(s), which can become active if the peer device platform currently operating in the active mode becomes un-operational or otherwise unavailable, or is forced into the standby mode by user initiated action. Each peer device platform can include substantially the same functional components as the other peer device platform, including at least a device health monitoring component and a rules engine. By detecting one or more failures and/or faults associated with one or more functional components included in the peer device platforms using the respective device health monitoring components, and generating, using the respective rules engines, health counts for the peer device platforms based at least on the detected failures/faults as well as one or more predetermined rules, failover decisions can be made based at least on a comparison of the health counts for the respective peer device platforms. Moreover, by formulating the predetermined rules to take into account the criticality of the detected failures/faults, and the redundancy and/or scalability of the functional components within the respective peer device platforms, such failover decisions can be beneficially made so as to reduce the overall impact on the telecommunications network, while beneficially providing an increased level of user control over the failover decisions.

Figure 1:
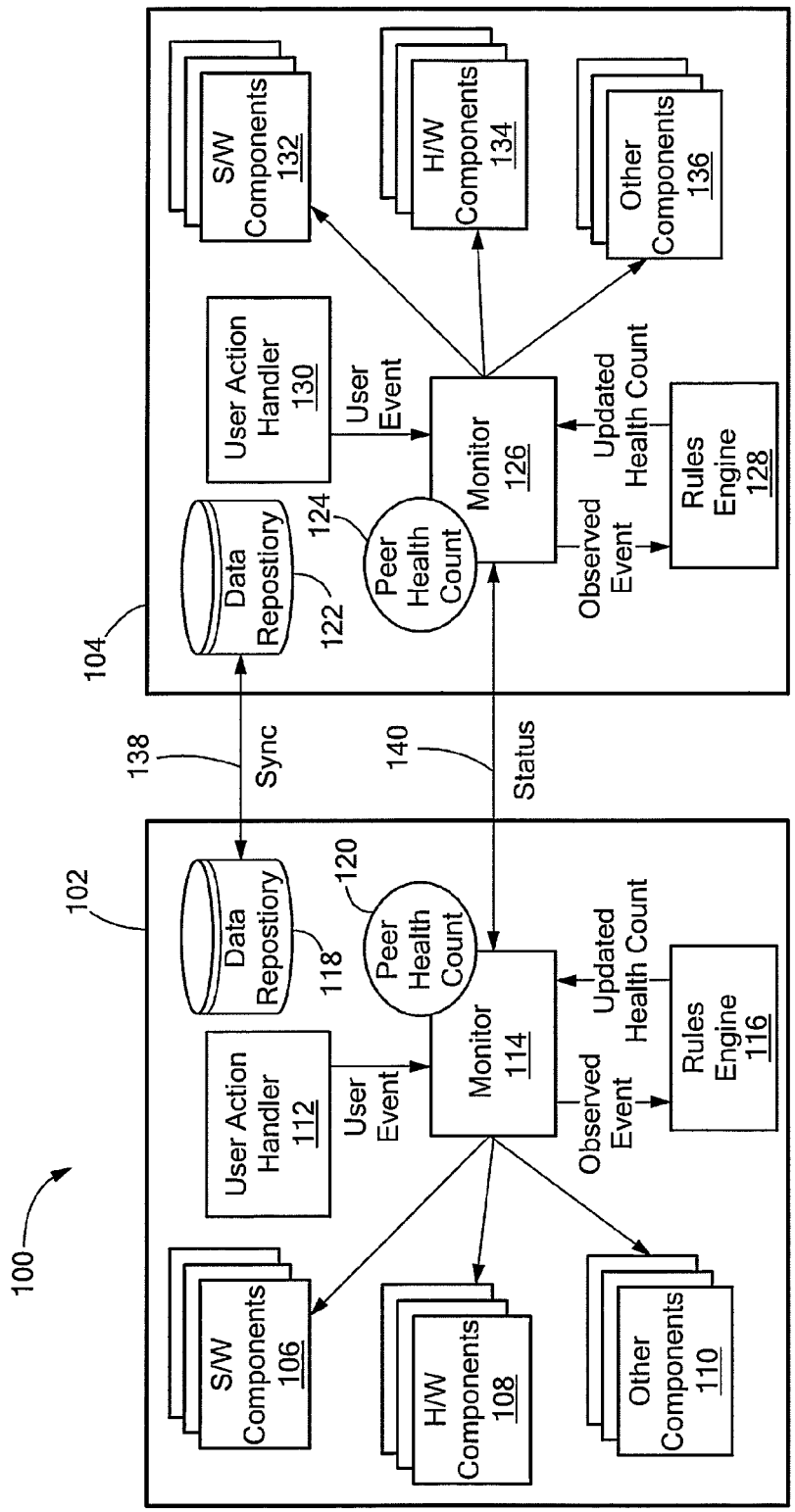
FIG. 1 is a block diagram of an exemplary high availability telecommunications system, including an exemplary active peer device platform and an exemplary standby peer device platform deployed in a 1+1 configuration, in accordance with an exemplary embodiment of the present application.

FIG. 1 depicts an illustrative embodiment of an exemplary high availability telecommunications system 100, in accordance with an exemplary embodiment of the present application. The exemplary high availability telecommunications system 100 includes a first peer device platform 102 and a second peer device platform 104. For example, the first peer device platform 102 and the second peer device platform 104 can each be implemented as an access system, a network management system, a media switching center, a cross-connect, a session border controller, as examples, and/or as any other suitable telecommunications system or device. The first peer device platform 102 includes a device health monitoring component 114, a rules engine 116, and a data repository 118, which is operative to store data, including, but not limited to, configuration data, for the first peer device platform 102. The first peer device platform 102 can also include one or more additional functional components, including one or more predetermined hardware components 108, one or more predetermined software components 106, at least one component 112 for handling user initiated actions from one or more user clients (such a component for handling user initiated actions is also referred to herein as a/the "user action handler"), and/or any other suitable functional components 110. Like the first peer device platform 102, the second peer device platform 104 includes a device health monitoring component 126, a rules engine 128, and a data repository 122 operative to store data, including, but not limited to, configuration data, for the second peer device platform 104. The second peer device platform 104 can also include one or more additional functional components, including one or more predetermined hardware components 134, one or more predetermined software components 132, at least one user action handler 130, and/or any other suitable functional components 136. For example, the predetermined hardware components 108, 134 can include one or more Ethernet links, one or more hard disks, and/or any other suitable hardware component(s). Further, the predetermined software components 106, 132 can include, for example, one or more call processing software components, and/or any other suitable software component(s). Moreover, the other suitable functional components 110, 136 can include one or more functional components for providing network edge security, one or more functional components for providing SIP control, and/or any other suitable functional components. One or more user clients can communicate with the user action handlers 112, 130 over one or more network connections to voluntarily initiate a switchover to activate whichever of the peer device platforms 102, 104 is operating in the standby mode (such a peer device platform operating in the standby mode is also referred to herein as a/the "standby peer device platform"), notwithstanding the possibility that the standby peer device platform may or may not have one or more failures and/or faults associated therewith, and that the other of the peer device platforms 102, 104 operating in the active mode (such a peer device platform operating in the active mode is also referred to herein as an/the "active peer device platform") may or may not have one or more failures and/or faults associated therewith.

It is noted that the data repository 118 included in the first peer device platform 102, and the data repository 122 included in the second peer device platform 104, can each store substantially the same configuration data. Further, the data repository 118 and the data repository 122 are communicably coupled to one another via a first network connection 138. Moreover, the device health monitoring component 114 included in the first peer device platform 102, and the device health monitoring component 126 included in the second peer device platform 104, are communicably coupled to one another via a second network connection 140. For example, the first network connection 138 and the second network connection 140 can be virtual network connections, and can share the same physical network connection.

In accordance with an exemplary mode of operation of the high availability telecommunications system 100 (see FIG. 1), the first peer device platform 102 and the second peer device platform 104 are deployed in a 1+1 configuration, in which the first peer device platform 102 is operating as the active peer device platform, and the second peer device platform 104 is operating as the standby peer device platform. It is noted that the first peer device platform 102 and the second peer device platform 104 can also be deployed in the 1+1 configuration with the second peer device platform 104 operating as the active peer device platform, and the first peer device platform 102 operating as the standby peer device platform. In such an exemplary embodiment, the first peer device platform 102 employs the rules engine 116 to generate a first or initial health count for the first peer device platform 102, based at least on the one or more predetermined rules.

Similarly, the second peer device platform 104 employs the rules engine 128 to generate a first or initial health count for the second peer device platform 104, based at least on the one or more predetermined rules. The rules engine 116 included in the first peer device platform 102, and the rules engine 128 included in the second peer device platform 104, are each operative to generate, calculate, derive, or otherwise obtain the first or initial health counts for their respective peer device platforms using their respective one or more predetermined rules, which can take into account the criticality of potential detected failures and/or faults, and the redundancy and/or scalability of the functional components within their respective peer device platforms. In accordance with this exemplary mode of operation of the high availability telecommunications system 100 (see FIG. 1), the predetermined rules can take into account (1) the criticality of potential detected failures/faults by assigning predetermined weighting to corresponding sets of functional components included in the respective peer device platforms 102, 104, and (2) the redundancy and/or scalability of the functional components within the respective peer device platforms 102, 104 by keeping track of the number of instances (such number of instances is also referred to herein as a/the "count") of each such functional component included in the corresponding sets of functional components. In effect, the predetermined weighting assigned to the sets of functional components can represent one or more criticality levels associated with the respective sets of functional components. Further, the count of each such functional component included in the sets of functional components can represent a redundancy or scalability level associated with the respective functional component. Having obtained the first or initial health counts for the respective first and second peer device platforms 102, 104, the rules engine 116 provides the first or initial health count for the first peer device platform 102 to the device health monitoring component 114, and the rules engine 128 provides the first or initial health count for the second peer device platform 104 to the device health monitoring component 126. Further, each of the device health monitoring components 114, 126 sends, over the second network connection 140, a status indication of its first or initial health count to the device health monitoring component included in the other peer device platform periodically, as required, and/or as desired.

Moreover, in response to the detection of one or more failures and/or faults associated with the first peer device platform 102 and/or the second peer device platform 104, the rules engines 116, 128 included in the respective peer device platforms 102, 104 can regenerate, recalculate, re-derive, or otherwise re-obtain the health count for the first peer device platform 102 and/or the health count for the second peer device platform 104, as appropriate, using one or more of the predetermined rules, thereby obtaining one or more updated health counts for the first peer device platform 102 and/or the second peer device platform 104. Further, the device health monitoring components 114, 126 included in the respective peer device platforms 102, 104 can send, over the second network connection 140, one or more subsequent status indications of their updated health count(s) to the device health monitoring component included in the other peer device platform periodically, as required, and/or as desired.

Figure 2:
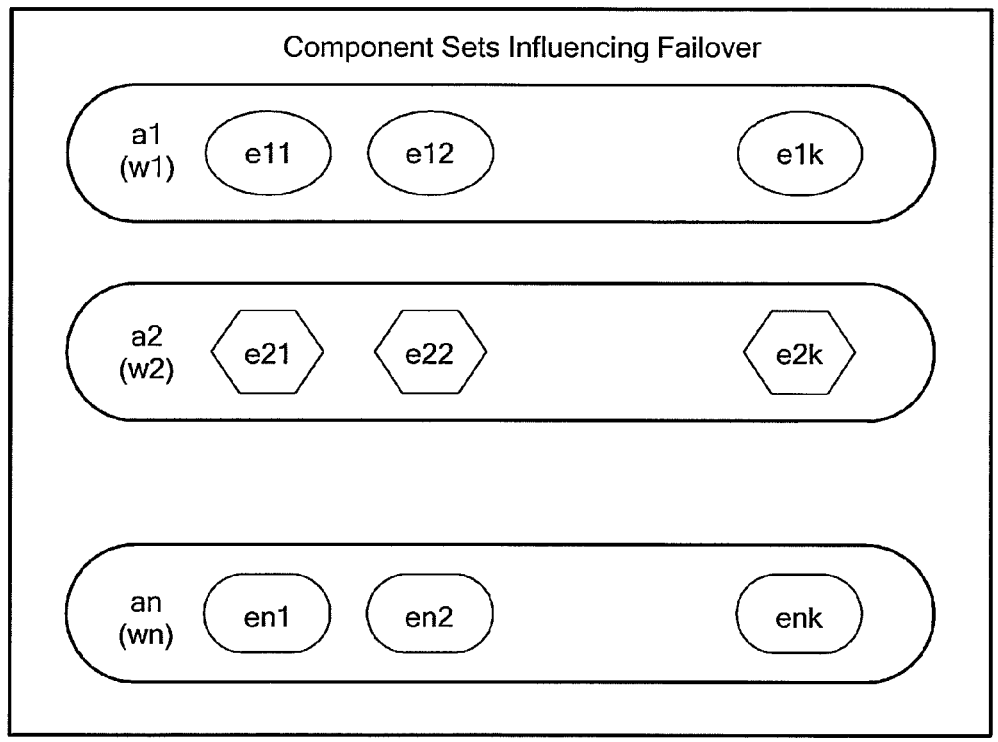
FIG. 2 is a diagram illustrating a plurality of exemplary functional component sets that may influence the initiation of a switchover from the exemplary active peer device platform to the exemplary standby peer device platform in the exemplary high availability telecommunications system of FIG. 1.

FIG. 2 depicts a plurality of exemplary functional component sets $a_1, a_2, \ldots, a_n$ that can be included, in whole or in part, in the first peer device platform 102 (see FIG. 1) and the second peer device platform 104 (see FIG. 1). One or more of the exemplary functional component sets $a_1, a_2, \ldots, a_n$ may influence the initiation of a switchover from the first peer device platform 102 operating as the active peer device platform to the second peer device platform 104 operating as the standby peer device platform. Each of the exemplary functional component sets $a_1, a_2, \ldots, a_n$ can represent a set of similar functional components within the peer device platforms 102, 104. For example, the functional component set $a_1$ can represent a set of Ethernet links $e_{11}, e_{12}, \ldots, e_{1k}$, the functional component set $a_2$ can represent a set of critical software components $e_{21}, e_{22}, \ldots, e_{2k}$, and the functional component set $a_n$ can represent an $n^{th}$ set of hardware components, software components, or any other suitable functional components $e_{n1}, e_{n2}, \ldots, e_{nk}$. With reference to the predetermined rules employed by the rules engine 116 (see FIG. 1) included in the first peer device platform 102, and the rules engine 128 (see FIG. 1) included in the second peer device platform 104, each of the functional component sets $a_1, a_2, \ldots, a_n$ can be assigned a predetermined weighting to account for the criticality of potential detected failures/faults associated with the respective functional component set. For example, the functional component set $a_1$ can be assigned a predetermined weighting $w_1$, the functional component set $a_2$ can be assigned a predetermined weighting $w_2$, and the functional component set $a_n$ can be assigned a predetermined weighting $w_n$. With further reference to the predetermined rules, each of the rules engine 116 and the rules engine 128 keeps track of the count of the functional components included in the functional component sets $a_1, a_2, \ldots, a_n$, as appropriate. For example, the Ethernet links $e_{11}, e_{12}, \ldots, e_{1k}$ included in the functional component set $a_1$, the critical software components $e_{21}, e_{22}, \ldots, e_{2k}$ included in the functional component set $a_2$, and the functional components $e_{n1}, e_{n2}, \ldots, e_{nk}$ included in the functional component set $a_n$, can each have a count represented by the variable "k" that is indicative of the redundancy and/or scalability of the functional components within the respective functional component sets $a_1, a_2, \ldots, a_n$.

In further accordance with this exemplary mode of operation of the high availability telecommunications system 100 (see FIG. 1), each of the device health monitoring component 114 (see FIG. 1) included in the first peer device platform 102, and the device health monitoring component 126 (see FIG. 1) included in the second peer device platform 104, monitors state changes associated with the functional components included in its respective peer device platform to detect one or more failures and/or faults associated with the functional components. For example, such failures/faults associated with the respective peer device platforms 102, 104 can include (1) a failure or a fault on a hardware component, such as an Ethernet link, a hard disk, or any other suitable hardware component, (2) a failure of a software component, such as a call processing software component or any other suitable software component, and/or (3) a determination that the configuration data stored in the data repository 118 (see FIG. 1) of the first peer device platform 102, and the configuration data stored in the data repository 122 (see FIG. 1) of the second peer device platform 104, are out-of-sync, such that at least a portion of the configuration data stored in the data repository 118 does not conform with a corresponding portion of the configuration data stored in the data repository 122. Each of the device health monitoring components 114, 126 can also monitor the user action handler 112 (see FIG. 1) and the user action handler 130 (see FIG. 1), respectively, for at least one user initiated switchover event, by which a user client (not shown) can voluntarily initiate a switchover to activate the second peer device platform 104 operating as the standby peer device platform, notwithstanding the possibility that the second peer device platform 104 operating as the standby peer device platform may or may not have one or more failures and/or faults associated therewith, and that the first peer device platform 102 operating as the active peer device platform may or may not have one or more failures and/or faults associated therewith.

Upon detecting one or more failures and/or faults associated with the first peer device platform 102 operating as the active peer device platform, the device health monitoring component 114 provides an indication of the detected failure/fault event to the rules engine 116. Based at least on the detected failure/fault associated with the first peer device platform 102, the rules engine 116 regenerates, recalculates, re-derives, or otherwise re-obtains the health count for the first peer device platform 102 using one or more of the predetermined rules, thereby obtaining an updated health count for the first peer device platform 102. The rules engine 116 provides an indication of the updated health count for the first peer device platform 102 to the device health monitoring component 114. The device health monitoring component 114 compares the updated health count for the first peer device platform 102 to the health count previously received over the second network connection 140 (see FIG. 1) for the second peer device platform 104, and makes a determination, based at least on the comparison result, as to whether or not to initiate a switchover from the first peer device platform 102 to the second peer device platform 104. For example, in the event the comparison result indicates that the updated health count for the first peer device platform 102 is less than the health count for the second peer device platform 104, the device health monitoring component 114 can communicate, over the second network connection 140, with the device health monitoring component 126 to initiate and ultimately accomplish the switchover from the first peer device platform 102 to the second peer device platform 104. Moreover, in the event the detected failure/fault indicates that the configuration data stored in the data repositories 118, 122 of the respective first and second peer device platforms 102, 104 are out-of-sync, the data repository 118 can communicate, over the first network connection 138 (see FIG. 1), with the data repository 122 to synchronize the configuration data stored in the data repositories 118, 122 of the respective peer device platforms 102, 104. In addition, in the event the detected failure/fault is indicative of a user initiated switchover event from a user client, the device health monitoring component 114 can obtain the difference between the updated health count for the first peer device platform 102 and the health count previously received for the second peer device platform 104, and add the obtained difference to the health count for the second peer device platform 104, thereby avoiding a potential, substantially immediate, subsequent switchover back to the first peer device platform 102 after having accomplished the desired user initiated switchover from the first peer device platform 102 to the second peer device platform 104.

The presently disclosed systems and methods of providing high availability of telecommunications systems and devices in a telecommunications network will be further understood with reference to the following illustrative, non-limiting examples, as well as FIG. 1. Each of the illustrative examples described herein involves two exemplary functional component sets $b_1$, $b_2$ that may influence the initiation of a switchover from the first peer device platform 102 (see FIG. 1) operating as the active peer device platform, to the second peer device platform 104 (see FIG. 1) operating as the standby peer device platform. For example, the exemplary functional component set $b_1$ can represent a single, critical software component, namely, a call processing software component, which is referred to herein as "CP." Because the call processing software component CP is regarded as a critical software component, the functional component set $b_1$ can be assigned a relatively high weighting value $w_{b1}$, for example, "50." Further, because the functional component set $b_1$ contains the single call processing software component CP, the functional component set $b_1$ has a count $c_{b1}$ equal to "1." The exemplary functional component set $b_2$ can represent a set of four hardware components, namely, four Ethernet links, which are referred to herein as $eth_0$, $eth_1$, $eth_2$, $eth_3$. Because the Ethernet links $eth_0$, $eth_1$, $eth_2$, $eth_3$ are not regarded as highly critical hardware components due, at least in part, to their redundancy and/or scalability, the functional component set $b_2$, despite the fact that it represents four components in total, can be assigned a lower weighting value $w_{b2}$, for example, "1." Further, because the functional component set $b_2$ contains the four Ethernet links $eth_0$, $eth_1$, $eth_2$, $eth_3$, the functional component set $b_2$ has a count $c_{b2}$ equal to "4." In each of the following illustrative examples, it is assumed that the first peer device platform 102 operating as the active peer device platform, and the second peer device platform 104 operating as the standby peer device platform, each include the call processing software component CP within the functional component set $b_1$, and the Ethernet links $eth_0$, $eth_1$, $eth_2$, $eth_3$ within the functional component set $b_2$. It is noted that, in each of the following illustrative examples, the first peer device platform 102 may alternatively take the role of the standby peer device platform, and the second peer device platform 104 may alternatively take the role of the active peer device platform. For example, within the high availability telecommunications system 100, the roles of the active peer device platform and the standby peer device platform can be dynamically determined based at least in part on the health counts for the respective peer device platforms 102, 104.

In a first such illustrative example, the first peer device platform 102 (see FIG. 1) and the second peer device platform 104 (see FIG. 1) are each powered-up and operating, and all of the functional components included in the respective first and second peer device platforms 102, 104, including the functional components within the functional component sets $b_1$, $b_2$, are operational. The first peer device platform 102 and the second peer device platform 104 employ the rules engine 116 (see FIG. 1) and the rules engine 128 (see FIG. 1), respectively, to generate a first or initial health count for the respective peer device platforms 102, 104. For example, each first/initial and subsequent health count, HC, for the first and second peer device platforms 102, 104 can be generated, calculated, derived, or otherwise obtained, as follows, $$HC = \sum_{i=1}^{n} c_i * w_i + U, \tag{1}$$

in which "$c_i$" corresponds to the count of the functional components within a respective functional component set $b_i$, "$w_i$" corresponds to the assigned weighting value of the respective functional component set $b_i$, and "U" corresponds to the count difference that may be added to the health count for the standby peer device platform (which, in this first example, is the second peer device platform 104) in the event of a user initiated switchover. The health count, HC, for each of the first and second peer device platforms 102, 104 can therefore be obtained, using equation (1) above, as follows, $$HC = (c_{b1} * w_{b1}) + (c_{b2} * w_{b2}) + U = 54, \tag{2}$$

in which "$c_{b1}$" corresponds to the count associated with the functional component set $b_1$, "$w_{b1}$" corresponds to the weighting value assigned to the functional component set $b_1$, "$c_{b2}$" corresponds to the count associated with the functional component set $b_2$, "$w_{b2}$" corresponds to the weighting value assigned to the functional component set $b_2$, and "U" corresponds to the count difference that may be added to the health count for the standby peer device platform (which, in this first example, is the second peer device platform 104) in the event of a user initiated switchover.

Accordingly, the first or initial health count, $HC_{initial}$, for each of the first and second peer device platforms 102, 104 can be obtained, using equation (2) above, as follows, $$HC_{initial}=(1*50)+(4*1)+0=54, \quad (3)$$

in which, from left-to-right in equation (3) above, "1" corresponds to the count $c_{b1}$ associated with the functional component set $b_1$, "50" corresponds to the weighting value $w_{b1}$ assigned to the functional component set $b_1$, "4" corresponds to the count $c_{b2}$ associated with the functional component set $b_2$, "1" corresponds to the weighting value $w_{b2}$ assigned to the functional component set $b_2$, and "0" corresponds to the count difference, U, that may be added to the health count for the standby peer device platform (which, in this first example, is the second peer device platform 104) in the event of a user initiated switchover.

In this first illustrative example, the device health monitoring component 114 (see FIG. 1) included in the first peer device platform 102 (see FIG. 1) detects a failure of the call processing software component CP within the respective peer device platform 102. Based at least on the detected failure of the call processing software component CP, the rules engine 116 (see FIG. 1) regenerates, recalculates, re-derives, or otherwise re-obtains the health count for the first peer device platform 102, using equation (2) above, thereby obtaining an updated health count, $HC_1$, for the first peer device platform 102, as follows, $$HC_1=(0*50)+(4*1)+0=4, \quad (4)$$

in which the count $c_{b1}$ associated with the functional component set $b_1$ is changed from "1" to "0" due to the failure of the call processing software component CP within the first peer device platform 102. The device health monitoring component 114 (see FIG. 1) compares the updated health count, $HC_1$, for the first peer device platform 102 to the first or initial health count, $HC_{initial}$, for the second peer device platform 104. Because the updated health count, $HC_1$, for the first peer device platform 102, namely, 4, is less than the first or initial health count, $HC_{initial}$, for the second peer device platform 104, namely, 54, the device health monitoring component 114 makes the determination to initiate a switchover from the first peer device platform 102 to the second peer device platform 104. Accordingly, the device health monitoring component 114 within the first peer device platform 102 communicates, over the second network connection 140 (see FIG. 1), with the device health monitoring component 126 (see FIG. 1) within the second peer device platform 104, to initiate and ultimately accomplish the switchover from the first peer device platform 102 to the second peer device platform 104.

In a second illustrative example, the first peer device platform 102 (see FIG. 1) and the second peer device platform 104 (see FIG. 1) are each powered-up and operating, and all of the functional components included in the first peer device platform 102, including the functional components contained in the functional component sets $b_1$, $b_2$, are operational. The first peer device platform 102 employs the rules engine 116 (see FIG. 1) to generate a first or initial health count, $HC_{initial}$, for the respective peer device platform 102, using equation (2) above, as follows, $$HC_{initial}=(1*50)+(4*1)+0=54. \quad (5)$$

Moreover, the device health monitoring component 126 included in the second peer device platform 102 detects a failure of one of the Ethernet links $eth_0$, $eth_1$, $eth_2$, $eth_3$ included in the second peer device platform 104. Based at least on the detected failure of the Ethernet link $eth_0$, $eth_1$, $eth_2$, or $eth_3$, the second peer device platform 104 employs the rules engine 128 (see FIG. 1) to generate a first or initial health count, $HC_{2initial}$, for the second peer device platform 104, using equation (2) above, as follows, $$HC_{2initial}=(1*50)+(3*1)+0=53, \quad (6)$$

in which the count $c_{b2}$ associated with the functional component set $b_2$ is changed from "4" to "3" due to the failure of one of the Ethernet links $eth_0$, $eth_1$, $eth_2$, $eth_3$ included in the second peer device platform 104.

In this second illustrative example, the device health monitoring component 114 (see FIG. 1) included in the first peer device platform 102 detects failures of two of the Ethernet links $eth_0$, $eth_1$, $eth_2$, $eth_3$ included in the first peer device platform 102. Based at least on the detected failures of the two Ethernet links $eth_0$, $eth_1$, $eth_2$, and/or $eth_3$, the rules engine 116 (see FIG. 1) regenerates, recalculates, re-derives, or otherwise re-obtains the health count for the first peer device platform 102, using equation (2) above, thereby obtaining an updated health count, $HC_1$, for the first peer device platform 102, as follows, $$HC_1=(1*50)+(2*1)+0=52, \quad (7)$$

in which the count $c_{b2}$ associated with the functional component set $b_2$ is changed from "4" to "2" due to the failure of two of the Ethernet links $eth_0$, $eth_1$, $eth_2$, $eth_3$ included in the first peer device platform 102. The device health monitoring component 114 compares the updated health count, $HC_1$, for the first peer device platform 102 to the first or initial health count, $HC_{initial}$, for the second peer device platform 104. Because the updated health count, $HC_1$, for the first peer device platform 102, namely, 52 (see equation (7) above), is less than the first or initial health count, $H_{initial}$, for the second peer device platform 104, namely, 53 (see equation (6) above), the device health monitoring component 114 makes the determination to initiate a switchover from the first peer device platform 102 to the second peer device platform 104, notwithstanding the fact that the second peer device platform 104 has detected a failure of one of its Ethernet links $eth_0$, $eth_1$, $eth_2$, $eth_3$. Accordingly, the device health monitoring component 114 within the first peer device platform 102 communicates, over the second network connection 140 (see FIG. 1), with the device health monitoring component 126 (see FIG. 1) within the second peer device platform 104, to initiate and ultimately accomplish the switchover from the first peer device platform 102 to the second peer device platform 104.

In a third illustrative example, the first peer device platform 102 (see FIG. 1) and the second peer device platform 104 (see FIG. 1) are each powered-up and operating, and all of the functional components included in the first peer device platform 102, including the functional components contained in the functional component sets $b_1$, $b_2$, are operational. The first peer device platform 102 employs the rules engine 116 to generate a first or initial health count, $HC_{initial}$, for the respective peer device platform 102, using equation (2) above, as follows, $$HC_{1initial}=(1*50)+(4*1)+0=54. \quad (8)$$

Moreover, the device health monitoring component 126 included in the second peer device platform 102 detects a failure of one of the Ethernet links $eth_0$, $eth_1$, $eth_2$, $eth_3$ included in the second peer device platform 104. Based at least on the detected failure of one of the Ethernet links $eth_0$, $eth_1$, $eth_2$, $eth_3$, the second peer device platform 104 employs the rules engine 128 to generate a first or initial health count, $HC_{2initial}$, for the second peer device platform 104, using equation (2) above, as follows, $$HC_{2initial}=(1*50)+(3*1)+0=53, \qquad (9)$$

in which the count $c_{b2}$ associated with the functional component set $b_2$ is changed from "4" to "3" due to the failure of one of the Ethernet links $eth_0$, $eth_1$, $eth_2$, $eth_3$ included in the second peer device platform 104.

In this third illustrative example, the device health monitoring component 114 included in the first peer device platform 102 monitors the user action handler 112 (see FIG. 1), and detects a user initiated switchover event, by which a user client voluntarily initiates a switchover to activate the second peer device platform 104 operating as the standby peer device platform, notwithstanding the fact that the first peer device platform 102 operating as the active peer device platform does not have any failures and/or faults associated therewith. The device health monitoring component 114 included in the first peer device platform 102 communicates, over the second network connection 140, with the device health monitoring component 126 included in the second peer device platform 104, to initiate the user initiated switchover from the first peer device platform 102 to the second peer device platform 104. The device health monitoring component 126 compares the first or initial health count $HC_{2initial}$ of 53 (see equation (9) above) for the second peer device platform 104 to the first or initial health count $HC_{initial}$ of 54 (see equation (8) above) for the first peer device platform 102. In addition, because the switchover from the first peer device platform 102 to the second peer device platform 104 is due to a user initiated switchover event, the device health monitoring component 126 obtains the difference between the first or initial health count $HC_{1initial}$ (e.g., 54) for the first peer device platform 102 and the first or initial health count $HC_{2initial}$ (e.g., 53) for the second peer device platform 104, and adds the obtained count difference (e.g., 54−53=1) to the health count for the second peer device platform 104 to obtain an updated health count, $HC_2$, for the second peer device platform 104, using equation (2) above, as follows, $$HC_2=(1*50)+(3*1)+1=54, \qquad (10)$$

in which the count, U (see also equation (2) above), corresponding to the count difference that may be added to the health count for the standby peer device platform in the event of a user initiated switchover, is changed from "0" to "1." Because the updated health count, $HC_2$, for the second peer device platform 104, and the first or initial health count, $HC_{1initial}$, for the first peer device platform 102, are now both equal to 54, a potential, substantially immediate, subsequent switchover back to the first peer device platform 102 can be avoided, after having accomplished the user initiated switchover from the first peer device platform 102 to the second peer device platform 104.

Figure 3:
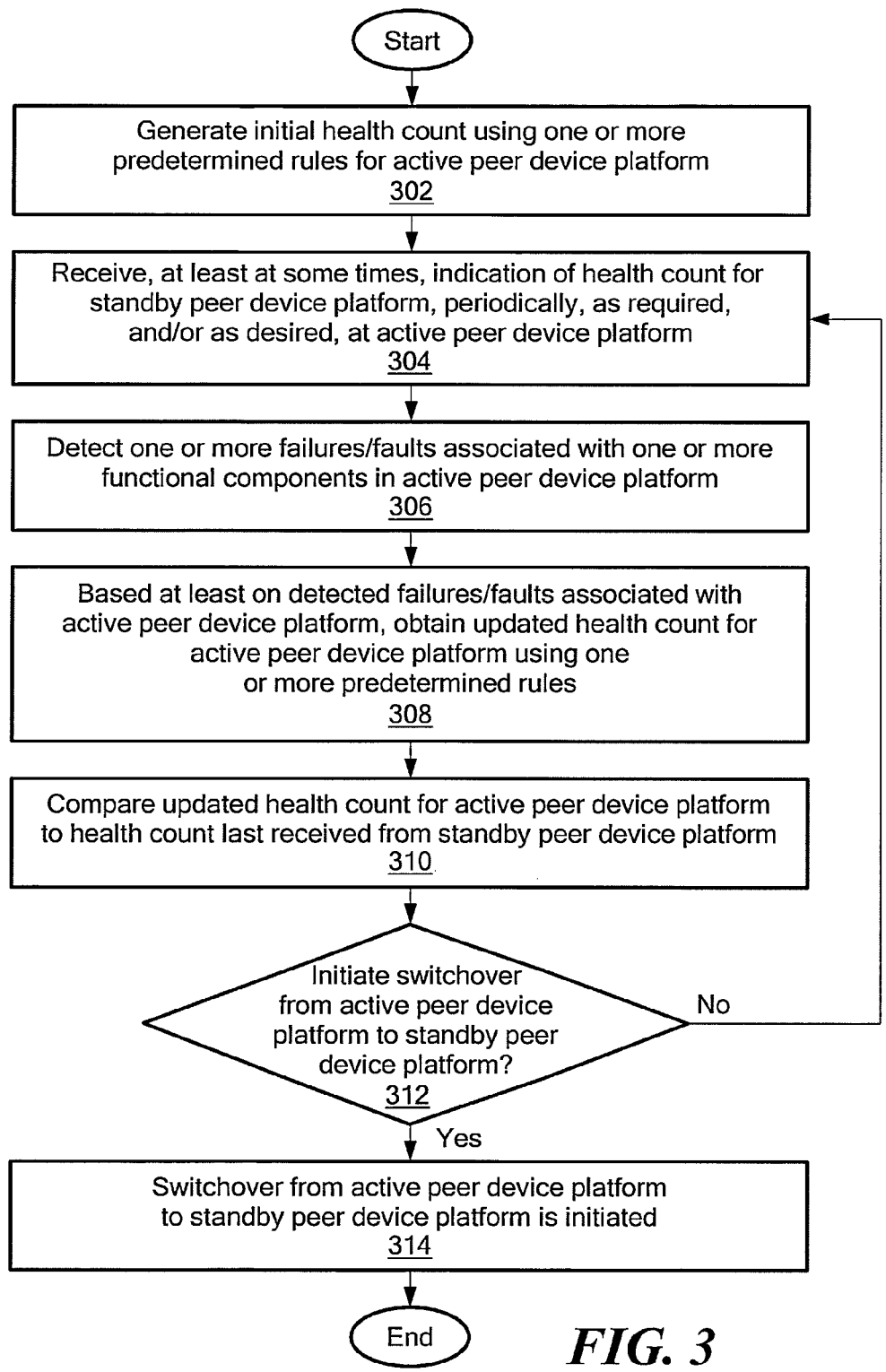
FIG. 3 is a flow diagram of an exemplary method of operating the exemplary high availability telecommunications system of FIG. 1.

An exemplary method of operating the high availability telecommunications system 100 is described below with reference to FIG. 3, as well as FIG. 1. As depicted in step 302 (see FIG. 3), a first or initial health count is generated, by the rules engine 116 (see FIG. 1) using one or more predetermined rules, for the first peer device platform 102 (see FIG. 1), which is currently operating as the active peer device platform. As depicted in step 304 (see FIG. 3), an indication of the health count for the second peer device platform 104 (see FIG. 1), which is currently operating as the standby peer device platform, is received, at least at some times, periodically, as required, and/or as desired, at the active peer device platform. As depicted in step 306 (see FIG. 3), one or more failures and/or faults associated with one or more functional components included in the active peer device platform are detected by the device health monitoring component 114 (see FIG. 1), which provides an indication of the detected failure(s)/fault(s) to the rules engine 116 (see FIG. 1). As depicted in step 308 (see FIG. 3), based at least on the detected failure(s)/fault(s) associated with the active peer device platform, an updated health count for the active peer device platform is obtained, using the one or more predetermined rules, by the rules engine 116 (see FIG. 1), which provides an indication of the updated health count for the active peer device platform to the device health monitoring component 114 (see FIG. 1). As depicted in step 310 (see FIG. 3), the updated health count for the active peer device platform is compared to the health count that was last received from the standby peer device platform at the active peer device platform. As depicted in step 312 (see FIG. 3), a determination is made, by the device health monitoring component 114 (see FIG. 1) based at least on the comparison result, as to whether or not to initiate a switchover from the active peer device platform to the standby peer device platform. As depicted in step 314 (see FIG. 3), in the event a determination is made to initiate a switchover from the active peer device platform to the standby peer device platform, the switchover from the active peer device platform to the standby peer device platform is initiated by the device health monitoring component 114 (see FIG. 1) and ultimately accomplished. Otherwise, in the event a determination is made not to initiate a switchover from the active peer device platform to the standby peer device platform, the exemplary method loops back to step 304 (see FIG. 3).

Having described the above illustrative embodiments of the presently disclosed systems and methods of providing high availability of telecommunications systems and devices in a telecommunications network, further embodiments and/or variations may be made/practiced. For example, one or more of the predetermined rules employed by the rules engine 116 (see FIG. 1) to obtain health counts for the first peer device platform 102 (see FIG. 1), as well as one or more of the predetermined rules employed by the rules engine 128 (see FIG. 1) to obtain health counts for the second peer device platform 104 (see FIG. 1), may be formulated such that the detection of one or more failures and/or faults associated with one or more redundant functional components included in the respective peer device platforms 102, 104 does not immediately cause a switchover to be initiated. In one or more alternative embodiments of the disclosed systems and methods, one or more of the predetermined rules can be formulated such that the detection of a failure(s)/fault(s) associated with a redundant functional component(s) does not cause the health count for the respective peer device platform to be regenerated, thereby avoiding any potential, unwarranted impact on system functionality in the event of a failure of such a redundant functional component.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A system for providing high availability of telecommunications systems and devices in a telecommunications network, comprising:
    at least two peer device platforms communicably connected to one another,
    wherein each of at least some of the at least two peer device platforms includes a device monitoring component, a rules engine, and one or more sets of functional components,
    wherein each of at least some of the at least two peer device platforms is operative:
        to detect, by the device monitoring component, one or more failures or faults associated with the one or more sets of functional components included in the respective peer device platform; and
        to generate, using the rules engine, at least one indication of a health condition of the respective peer device platform based at least on the one or more detected failures or faults and one or more predetermined rules; and wherein at least one of the at least two peer device platforms is operative to make a failover decision based at least in part on comparative values of the respective indications of the health conditions of the at least two peer device platforms.

2. The system of claim 1 wherein the rules engine is operative to formulate the one or more predetermined rules by assigning predetermined weighting to the respective sets of functional components.

3. The system of claim 2 wherein the at least one indication of the health condition of the respective peer device platform corresponds to one or more health counts associated with the functional components in the respective sets of functional components included in the respective peer device platform, and wherein the rules engine is further operative to formulate the one or more predetermined rules by keeping track of the one or more health counts associated with the functional components in the respective sets of functional components.

4. The system of claim 3 wherein the sets of functional components include one or more of a first set of hardware components and a second set of software components.

5. The system of claim 3 wherein the predetermined weighting assigned to the respective sets of functional components represents one or more criticality levels associated with the respective sets of functional components.

6. The system of claim 3 wherein the one or more health counts associated with the functional components in the respective sets of functional components represent one or more redundancy or scalability levels associated with the respective functional components.

7. The system of claim 3 wherein the at least two peer device platforms include one peer device platform operating in an active mode, and another peer device platform operating in a standby mode.

8. The system of claim 7 wherein the peer device platform operating in the active mode includes a first rules engine, and wherein the first rules engine is operative, in response to detection of the one or more failures or faults associated with the one or more sets of functional components included in the peer device platform operating in the active mode, to obtain, using the one or more predetermined rules, a first health count representing a health condition of the peer device platform operating in the active mode.

9. The system of claim 8 wherein the peer device platform operating in the standby mode includes a second rules engine, and wherein the second rules engine is operative to obtain, using the one or more predetermined rules, a second health count representing a health condition of the peer device platform operating in the standby mode.

10. The system of claim 9 wherein at least the first rules engine included in the peer device platform operating in the active mode is further operative to obtain the first health count representing the health condition of the peer device platform operating in the active mode, in accordance with an expression, $$HC = \sum_{i=1}^{n} c_i * w_i + U,$$

in which "HC" corresponds to the first health count representing the health condition of the peer device platform operating in the active mode, "i" corresponds to a respective one of "n" sets of functional components included in the peer device platform operating in the active mode, "$c_i$" corresponds to the one or more health counts associated with the functional components in the respective one of the n sets of functional components, "$w_i$" corresponds to the predetermined weighting assigned to the respective one of the n sets of functional components, and "U" corresponds to a value that may be added to the second health count representing the health condition of the peer device platform operating in the standby mode in the event of a user initiated switchover.

11. The system of claim 7 wherein the peer device platform operating in the active mode includes a first device monitoring component, and wherein the first device monitoring component is operative to detect the one or more failures or faults associated with the one or more sets of functional components included in the peer device platform operating in the active mode.

12. The system of claim 11 wherein the peer device platform operating in the active mode includes a first rules engine, and wherein the first rules engine is operative, in response to detection of the one or more failures or faults associated with the one or more sets of functional components, to obtain, using the one or more predetermined rules, a first health count representing a health condition of the peer device platform operating in the active mode.

13. The system of claim 12 wherein the peer device platform operating in the standby mode includes a second rules engine, and wherein the second rules engine is operative to obtain, using the one or more predetermined rules, a second health count representing a health condition of the peer device platform operating in the standby mode.

14. The system of claim 13 wherein the peer device platform operating in the standby mode is operative to provide the second health count representing the health condition of the peer device platform operating in the standby mode to the peer device platform operating in the active mode.

15. The system of claim 14 wherein the first device monitoring component included in the peer device platform operating in the active mode is further operative to compare a value of the first health count representing the health condition of the peer device platform operating in the active mode with a value of the second health count representing the health condition of the peer device platform operating in the standby mode.

16. The system of claim 15 wherein the first device monitoring component included in the peer device platform operating in the active mode is further operative to make the failover decision based at least in part on the comparative values of the first health count and the second health count.

17. The system of claim 1 wherein at least two of the peer device platforms each include a data repository, and wherein the one or more failures or faults associated with the one or more sets of functional components included in the respective peer device platform correspond to a determination that data stored in the respective data repositories are out-of-sync.

18. The system of claim 1 wherein the at least one of the peer device platforms further includes at least one functional component for handling user initiated actions, and wherein the one or more failures or faults associated with the one or more sets of functional components included in the respective peer device platform correspond to one or more user initiated switchover events.

19. A method of providing high availability of telecommunications systems and devices in a telecommunications network, comprising:
  detecting, by a first device monitoring component included in an active peer device platform, one or more failures or faults associated with one or more sets of functional components included in the active peer device platform;
  generating, by a first rules engine included in the active peer device platform, an indication of a health condition of the active peer device platform based at least on the one or more detected failures or faults and one or more predetermined rules; and
  making, by the first device monitoring component included in the active peer device platform, a decision to failover from the active peer device platform to a standby peer device platform based at least in part on comparative values of the indication of the health condition of the active peer device platform and an indication of a health condition of the standby peer device platform.

20. The method of claim 19 further comprising:
  formulating the one or more predetermined rules by assigning predetermined weighting to a plurality of sets of functional components included in one or both of the active peer device platform and the standby peer device platform.

21. The method of claim 20 wherein the indications of the health conditions of the active peer device platform and the standby peer device platform correspond to one or more health counts associated with the functional components in the respective sets of functional components included in the active peer device platform and the standby peer device platform, and wherein the formulating of the one or more predetermined rules includes formulating the one or more predetermined rules by keeping track of the one or more health counts associated with the functional components in the respective sets of functional components.

22. The method of claim 19 further comprising:
  in response to detection of the one or more failures or faults associated with the one or more sets of functional components, obtaining, by the first rules engine using the one or more predetermined rules, a first health count representing the health condition of the active peer device platform.

23. The method of claim 22 further comprising:
  obtaining, by a second rules engine included in the standby peer device platform using the one or more predetermined rules, a second health count representing the health condition of the standby peer device platform.

24. The method of claim 23 further comprising:
  providing, by the standby peer device platform, the second health count representing the health condition of the standby peer device platform to the active peer device platform.

25. The method of claim 24 further comprising:
  comparing, by the first device monitoring component included in the active peer device platform, a value of the first health count representing the health condition of the active peer device platform with a value of the second health count representing the health condition of the standby peer device platform.

26. The method of claim 25 further comprising:
  making, by the first device monitoring component included in the active peer device platform, the failover decision based at least in part on the comparative values of the first health count and the second health count.

27. A system for providing high availability of telecommunications systems and devices in a telecommunications network, comprising:
  an active peer device platform including a first device monitoring component and a first rules engine; and
  a standby peer device platform including a second device monitoring component and a second rules engine, the standby peer device platform being communicably connected to the active peer device platform, wherein the first device monitoring component is operative to detect one or more failures or faults associated with one or more sets of functional components included in the active peer device platform, wherein the first rules engine is operative, in response to detection of the one or more failures or faults, to obtain, using the one or more predetermined rules, a first health count representing a health condition of the active peer device platform, wherein the second rules engine is operative to obtain, using the one or more predetermined rules, a second health count representing a health condition of the standby peer device platform, wherein the standby peer device platform is operative to provide the second health count representing the health condition of the standby peer device platform to the active peer device platform, and wherein the first device monitoring component is further operative:
- to compare a value of the first health count representing the health condition of the active peer device platform with a value of the second health count representing the health condition of the standby peer device platform; and
- to make a decision to failover from the active peer device platform to the standby peer device platform based at least in part on comparative values of the first health count and the second health count.

* * * * *